Sept. 27, 1932.     M. PINKOSH     1,879,949
CAMERA WITH CONVEX MIRROR

Filed June 23, 1930

INVENTOR
MICHAEL PINKOSH
BY
Reif + Braddock
ATTORNEYS

Patented Sept. 27, 1932

1,879,949

UNITED STATES PATENT OFFICE

MICHAEL PINKOSH, OF MINNEAPOLIS, MINNESOTA

CAMERA WITH CONVEX MIRROR

Application filed June 23, 1930. Serial No. 463,108.

This invention relates to a camera provided with a convex mirror, and the object of the invention is to equip any ordinary or preferred type of camera with a convex mirror for affording to a person while being photographed a visual image of himself and knowledge as to the location where a picture to be taken will appear upon a film or plate.

With the above object in view, as well as others which will appear as the specification proceeds, the invention will now be fully described, it being understood that the disclosure herein is merely illustrative and intended in no way in a limiting sense, changes in details of construction and arrangement of parts being permissible within the scope of the claims which follow.

In the accompanying drawing forming a part of this specification,

Figure 1:
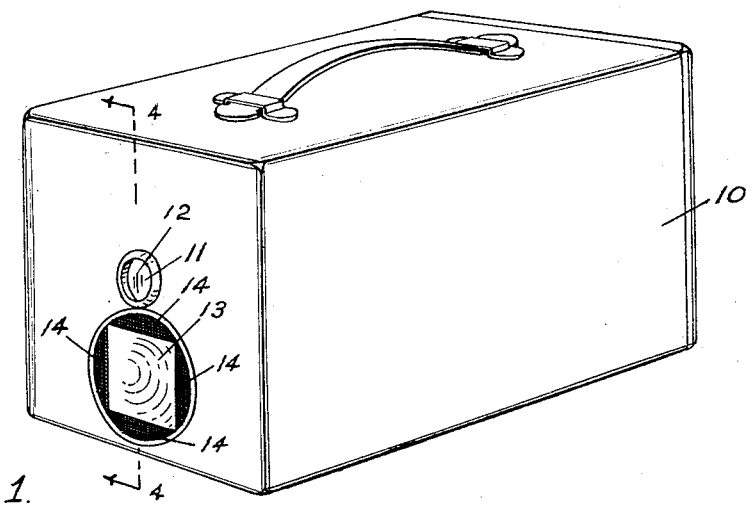
Fig. 1 is a perspective view of a camera equipped with a convex mirror according to the invention, the mirror being permanently or fixedly attached to the camera.

With respect to the drawing, numeral 10 represents the cabinet or case of a camera which may be of any ordinary or preferred construction, 11 indicates the usual opening through the cabinet or case to a lens 12 for focusing an image upon a film or plate (not shown) within the cabinet or case, and 13 designates a convex mirror upon the cabinet or case and arranged adjacent the opening 11 to serve as a finder for a person being photographed on the film or plate of the camera.

As disclosed in each of the figures of the drawing, the convex mirror 13 is below the opening 11. It could, however, be above or at a side of said opening. It is desirable for a person whose picture is being taken to know what kind of a picture will result, and the purpose of the convex mirror 13 is to afford to a person being photographed a visual image of himself and knowledge as to the location where a picture to be taken will appear upon the film or plate of the camera, in order that said person can change his position or correct his posture before the picture is snapped. That is to say, the convex mirror serves as a guide or finder to a person whose picture is being taken so that said person can position himself to properly place the picture upon the film or plate and can adjust himself to a desired pose.

Figure 4:
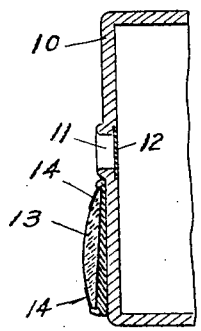
Fig. 4 is a detail sectional view taken on line 4—4 in Fig. 1.

Naturally, the convex mirror will have relation to the lens and its opening so that when the image of the person being photographed is visible to said person in said convex mirror, the picture will be placed upon the film or plate of the camera, and in order that the picture can be more accurately positioned upon said film or plate, the convex mirror has shape substantially corresponding to the shape of the film or plate. That is to say, in the case of a square film or plate, the convex mirror is desirably of square configuration, and in the case of a rectangular film or plate, the convex mirror is desirably of similar rectangular configuration. It will be noted that as clearly shown in Figs. 1 and 2, the sides of the mirror 13 are parallel to the side walls of the camera and the vertical corners thereof, and the top and bottom of said mirror are parallel respectively to the top and bottom edges or surfaces of said camera. Preferably, the image of the person being photographed should appear approximately at the position upon the convex mirror correspondng to the position where the picture is placed upon the film or plate, and to this end I have in Figs. 2 and 4 shown said convex mirror tilted slightly forwardly from the adjacent vertical face of the camera and upwardly, with its opposite side edges equidistantly disposed relatively to said adjacent vertical face. Any other suitable arrangement for accomplishing the result can be employed.

In practice, the convex mirror utilized can be of circular or other configuration with parts covered, or otherwise made ineffective as reflecting surfaces, as denoted at 14, to trim said mirror to the form desired, as, for example, to rectangular configuration, or to square configuration as disclosed.

Desirably, though not necessarily, the convex mirror will have area similar to the area of the film or plate employed in the camera with which the convex mirror is provided.

Figure 2:
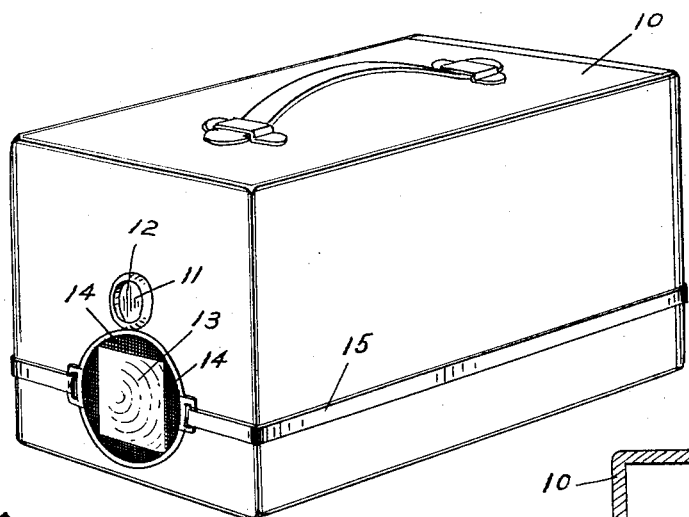
Fig. 2 is a perspective view of a camera of similar type equipped with a convex mirror according to the invention, the mirror being removably attached to the camera.

As shown in Fig. 1, the convex mirror is constructed as a permanent or fixed part of the camera. It can be so constructed in any manner which may in a particular instance be deemed preferable.

As shown in Fig. 2, the convex mirror is constructed as a separate article of manufacture removably attached to the camera, as by straps 15 suitably connected to said convex mirror and encircling the camera. Straps 15 are preferably elastic.

Figure 3:
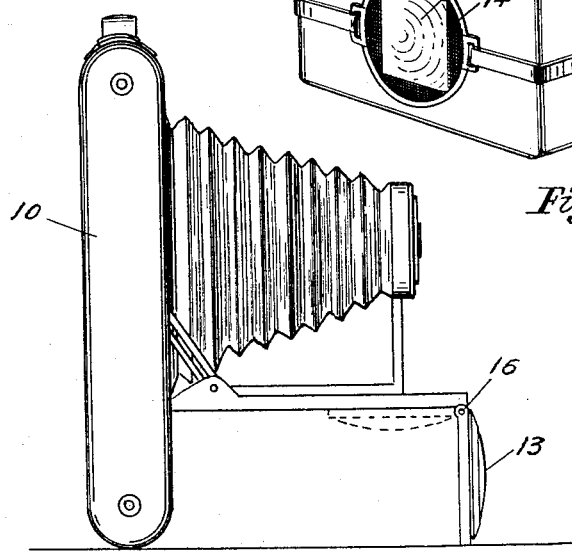
Fig. 3 is an elevational view of a camera of folding type equipped with a convex mirror according to the invention, the mirror being pivotally supported upon the camera.

As shown in Fig. 3, the convex mirror is pivotally supported at 16 upon the camera to swing to approximately vertical position for use and to be foldable against the camera when idle.

An important advantage of the convex mirror is reduction of the image when viewed by a person being photographed so that said person can see the whole of his image. Were an ordinary mirror of the same or larger size employed, instead of a convex mirror, it would be ineffective to accomplish the result for the reason that the whole of the image of a person being photographed would not appear in said ordinary mirror unless of dimensions greatly in excess of the dimensions a convex mirror suitable to the present purposes is required to have.

It will be obvious that by utilization of the present combination camera and convex mirror (together with suitable paraphernalia, not shown, of ordinary or preferred construction and now of commerce, by employment of which a person can snap his own photograph), pictures taken by a person being photographed can be much more accurately made because my present arrangement eliminates the guess work which has heretofore necessarily been required. Thus the group can now be efficiently photographed as a whole, without necessity for absence from the picture of a member of the group to serve as the cameraman.

It should be stated that persons whose pictures are being taken will have their attention arrested by the task of gazing at themselves in the convex mirror, and thus their poses and their expressions will have tendency toward being natural and at ease when a photograph is snapped.

The device will be particularly useful in taking the pictures of children, as they will be interested in looking in the mirror at their reflections. It will be understood that the mirror will be so designed as to curvature that the full height of the person can be seen from six to eight feet, which is the distance usually used when taking pictures of persons with a camera. At such distance, the full height of the person appears nicely upon the film.

What I claim is:

1. The combination with a portable camera having a lens adjacent a wall thereof for focusing an image upon a film or plate at the side of said lens opposite said image, of a convex finder rectangular in outline in proximity to said wall and arranged at a side of said lens out of alinement therewith, said finder mirror being adapted to make the image of a person being photographed visible to said person at a location upon said convex finder mirror substantially similar to the location at which said image is focused upon said film or plate, and the side edges of said mirror being adapted to serve as guides for situating said camera in horizontal position.

2. The combination with a portable camera including a cabinet having a lens for focusing an image upon a film or plate at the rear of said lens, of a convex finder mirror adjacent said lens and out of alinement therewith and having the sides thereof arranged substantially parallel with the side marginal portions of said cabinet whereby to provide means adapted to serve as guides for situating said cabinet in horizontal position, said finder mirror being adapted to make the image of a person being photographed visible to said person at a location substantially similar to the location at which said image is focused upon said film or plate, and said finder mirror having curvature such as to reflect a full size image when said full size image is focused upon said film or plate.

3. The combination with a portable camera having a casing with side, top and bottom walls at right angles to each other, and constructed and arranged to take a picture rectangular in form, of a convex finder mirror rectangular in outline in fixed position on said camera at one side of the lens thereof, constructed and arranged to make the image of a person being photographed visible to said person, said image being located upon said mirror substantially similar to its location upon the film or plate used in said camera, said mirror having its sides parallel to said side walls and of a shape similar to the film or plate used in the camera.

4. The combination of a portable camera having a casing with side, top and bottom walls at right angles to each other and a lens disposed in the front wall thereof, of a convex finder mirror at one side of said lens and in fixed relation thereto, said mirror being rectangular in outline with its side edges parallel to said side walls and its top and bottom edges parallel respectively to the top and bottom walls of said casing, said mirror being constructed and arranged to make the image of a person being photographed visible to said person, said image being disposed on said mirror substantially similar to its location upon a film or plate used in said camera, said mirror being shaped similarly to the film or plate used in said camera, the side edges of said mirror also assisting in disposing said camera with its side walls vertical.

MICHAEL PINKOSH.